United States Patent [19]

Johnson

[11] 4,352,051

[45] Sep. 28, 1982

[54] SINGLE PHASE MOTOR WITH REVERSIBLE AUXILIARY WINDINGS

[75] Inventor: John H. Johnson, Tipp City, Ohio

[73] Assignee: General Electric Company, Fort Wayne, Ind.

[21] Appl. No.: 283,870

[22] Filed: Jul. 16, 1981

Related U.S. Application Data

[63] Continuation of Ser. No. 152,754, May 23, 1980.

[51] Int. Cl.³ .............................................. H02P 1/44
[52] U.S. Cl. .................... 318/790; 318/425; 318/525; 318/785; 318/797; 310/198
[58] Field of Search ............... 318/784, 785, 786, 787, 318/788, 789, 790, 793, 796, 797, 816, 817, 523, 524, 525, 424, 425; 310/198, 140

[56] References Cited

U.S. PATENT DOCUMENTS

| | | | |
|---|---|---|---|
| 1,912,337 | 5/1933 | Kennedy | 318/817 |
| 3,348,109 | 10/1967 | Wright | 318/807 |
| 4,063,135 | 12/1977 | Wanlass | 318/795 |
| 4,107,583 | 8/1978 | Houtman | 318/724 |
| 4,152,630 | 5/1979 | Wanlass | 318/796 |

*Primary Examiner*—David Smith, Jr.
*Attorney, Agent, or Firm*—Ralph E. Krisher, Jr.

[57] ABSTRACT

A single phase motor is disclosed which comprises a stator assembly having a main winding, a start winding and an auxiliary winding wherein the start and auxiliary windings are connected in two alternative configurations during start and run conditions, respectively. During the start condition, the start and auxiliary windings are interconnected by a series connection which causes current to flow through the auxiliary winding in a reverse direction to the flow through the start winding so that there exists a bucking magnetic relationship between the fields in the start and auxiliary windings. During the run condition of the motor, however, the start and auxiliary windings are interconnected by a second series electrical connection which causes the current to flow through the auxiliary winding in a direction opposite the first direction so as to cause the magnetic fields in the start and auxiliary windings to be in an aiding relationship thereby improving motor operating efficiency. In one embodiment, the auxiliary winding is formed as a single coil for each of the poles of the motor, and these coils are disposed within respective slot pairs. In another embodiment, the auxiliary winding is distributed in all of the slots occupied by the start winding so as to obtain better start winding harmonics and lower end turn factor. End turn factor is a measure of the tightness at the end turns and is the ratio of the end turn conductor cross sectional area to the area available for the end turns.

22 Claims, 7 Drawing Figures

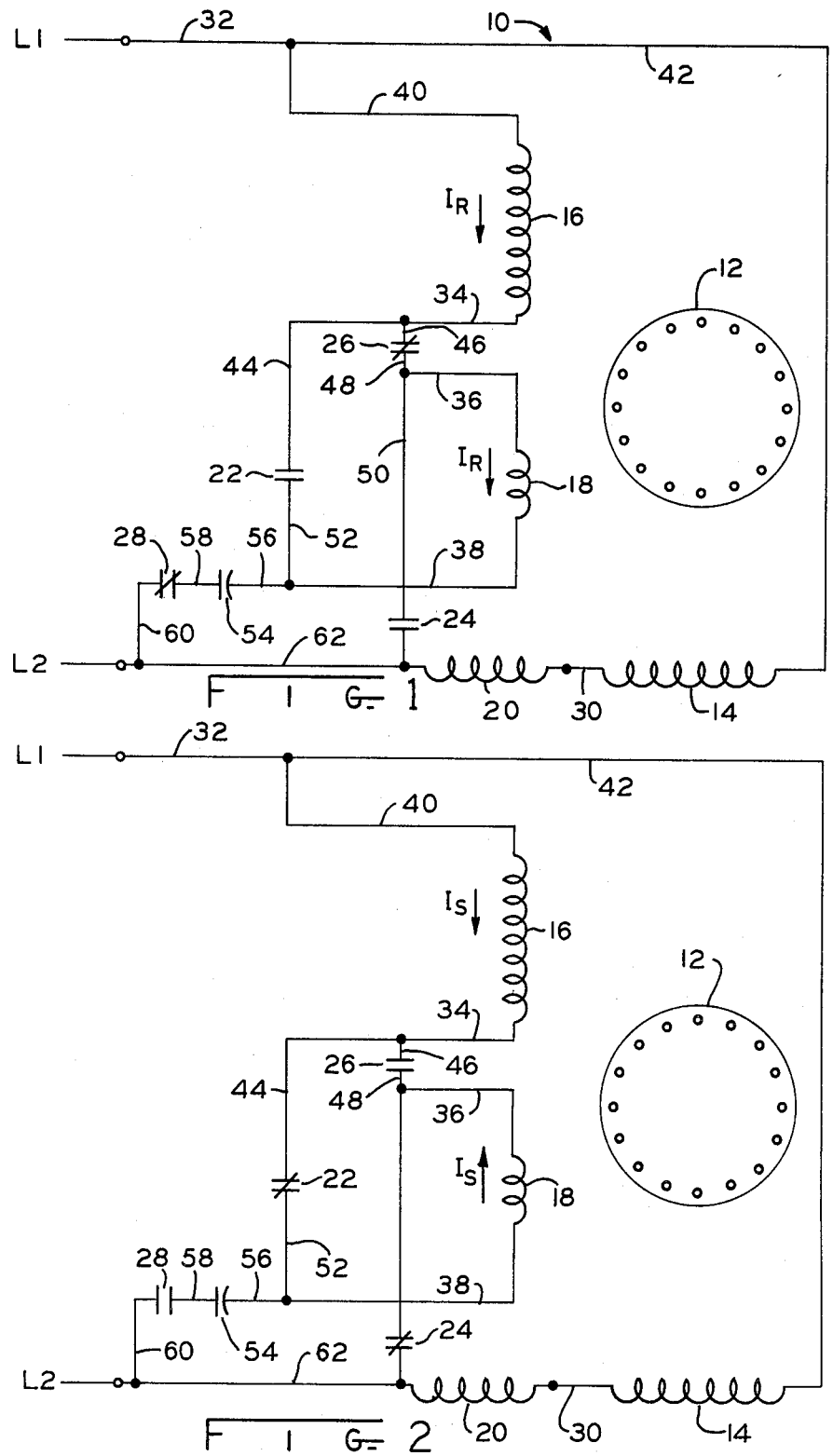

SINGLE PHASE MOTOR WITH REVERSIBLE AUXILIARY WINDINGS

This is a continuation of application Ser. No. 152,754, filed May 23, 1980.

Application Ser. No. 152,755, filed on May 23, 1980 contains subject matter related to this application.

BACKGROUND OF THE INVENTION

The present invention relates generally to electric motors, and particularly to winding arrangements and methods of fabricating and operating single phase induction motors.

Induction motors of the resistance start, induction run variety, also known as resistance split phase motors, are used in a number of applications such as refrigerators, freezers, furnaces, dehumidifiers, and pumps. Typically, such motors are provided with a main winding and a start winding with the start winding being deenergized during the running condition of the motor. The start winding is typically switched out of the motor circuit as the motor approaches running speed by a switching device, such as a current activated relay, a centrifugal switch, a voltage operated switch, or a magnetically operated switch.

Resistance start, induction run motors generally utilize the resistance of the start winding to achieve the desired current phase displacement between the current of the main winding and the current of the start winding for starting the motor. The necessary resistance is often achieved by providing a plurality of coils with each comprising a predetermined number of forward conductor turns, which are distributed in selected slots of a magnetic core, and providing an auxiliary coil by winding a conductor in a direction reverse from that of the forward wound coils of the start winding. The magnetic effect of the reverse wound coil is essentially cancelled by increasing the number of the effective forward wound turns of one of the start coils by the same number of effective turns.

This magnetic field cancelling effect may also be provided by winding the start winding in two parts and then disposing the two parts in a magnetic core such that the magnetic fields produced thereby are in a bucking relationship. From the standpoint of terminology, subsequent discussion of reverse turns or reverse wound coil or coils is intended to mean turns or coils formed by either winding in a direction opposite the forward wound coils of a start winding, or turns or coils formed separately from the remaining coils of a start winding but disposed and corrected in a magnetic core in a manner so as to produce bucking magnetic fields.

Because of the decreasing availability of energy and the concomitant sharp increase in cost, increased efforts have been made to improve motor efficiencies with much of the effort being directed toward the design of capacitor run motors for applications in which resistance start, induction run motors have been used previously. Even though capacitor run motors increase motor operating efficiency, the design and manufacture of typical capacitor run motors represents a considerable added expense over resistance start, induction run motors, thus limiting the applications where capacitor run motors are economically feasible. The economic feasibility of utilizing a capacitor run motor in lieu of a resistance start, induction run motor is especially limited in situations where the capacitor run motor is designed to approach balanced operation in order to optimize operating efficiency. Furthermore, it is known that typical capacitor run motors often encounter problems resulting from the inherent low starting torque of such motors.

Efforts have been made to broaden the range of applicability of capacitor run motors by developing starting arrangements to increase their starting torque. For example, externally connected resistors have been connected in series with the start winding and a relay for disconnecting the externally mounted resistor, during the run condition of the motor. However, the adding of an externally mounted resistor represents still another expense or additional cost which even further limits the applications in which capacitor run motors can be economically substituted for resistance start, induction run motors.

It is desirable, therefore, to develop winding and connection arrangements for single phase induction motors which would improve their operating efficiency at a minimum of cost, thereby permitting their use in a wide variety of applications currently being served by resistance start, induction run motors. Furthermore, it is desirable to develop single phase motors which would not suffer from low starting torque and the relatively high cost associated with typical capacitor run motors.

As discussed previously, many single phase induction motors are fabricated with a start winding resistance to provide the desired phase displacement for motor starting. This resistance is achieved either by providing a start winding having both forward and backward wound conductor turns, or by providing a two part start winding wherein the respective parts are wound and disposed on the magnetic core so that their respective magnetic fields are in a bucking relationship. However, the backward wound or disposed turns must either be removed from the motor circuit during the run condition or a relatively large run capacitor must be utilized in order to improve motor operating efficiency.

One known approach for partially solving some of the previously discussed problems associated with the use of a start winding having a reverse wound or disposed portion in a capacitor run motor is disclosed in Houtman U.S. Pat. No. 4,107,583, which issued on Aug. 15, 1978 and is assigned to the assignee of the present invention. The entire disclosure of the Houtman patent is incorporated herein by reference. This patent discloses, among other things, a connection arrangement wherein the reverse wound or disposed portion of the start winding is disconnected during the running condition of the motor, thereby improving motor operating efficiency while obtaining a relatively high starting torque for the motor.

It is desirable, however, to even further increase motor operating efficiencies of single phase induction motors without greatly increasing their cost. Furthermore, it is desirable to retain the starting characteristics or torque of the resistance start, induction run motors, thereby eliminating any need for externally mounted resistors to obtain an acceptable starting torque. Still further, it would be desirable to develop winding and connection arrangements which would use capacitors to increase motor efficiency, particularly in the run condition, wherein the capacitor size could be minimized and, thus, reduce the cost necessary to obtain such improved efficiencies.

Accordingly, it is an object of the present invention to provide new and improved dynamoelectric machine winding and connection arrangements which improve operating efficiency.

Another object of the present invention is to provide new and improved winding connection arrangements and operating methods for single phase conduction motors which can be readily and economically employed to increase motor efficiencies in applications typically served by resistance start, induction run motors.

Yet another object of the present invention is to provide new and improved capacitor run induction motors which maximize winding utilization and improve motor performance without the necessity of any external resistance for the purpose of starting.

A further object of the present invention is to provide new and improved winding and interconnection arrangements for use with conventional resistance start, induction run motors to improve efficiency.

A still further object of the present invention is to provide new and improved operating methods and winding connection arrangements for use with conventional resistance start, induction run motors which optimize the employment of capacitors and which reduce the capacitor requirements necessary to obtain an optimum improved efficiency with such conventional motors.

In the resistance start, induction run motors discussed above that employ reverse wound or disposed coils for increasing the resistance of the start winding, the reverse wound or disposed coil is typically positioned in the same slots as one of the forward wound coils of the start winding. In some cases, however, two reverse wound coils have been utilized because of insufficient slot space to accommodate the necessary number of reverse conductor turns, and "spill over" into adjacent slots occurred. Thus, the turns of the "backlash winding", as the backward or reverse wound turns are often called, have been concentrated in one pair of slots, normally the slots for the outermost coils, with some of the windings spilling over into the adjacent slot pair. The problem with such a concentration of backlash turns is that it causes the end turns thereof about the faces of the core to protrude outside the available mounting space. This is particularly troublesome in motor applications where space is at a premium, such as, for example, hermetic compressors. This exceeding of available mounting space is especially great when some or all of the motor windings are made of aluminum rather than copper because of the increased wire size in aluminum in order to provide the necessary amount of current carrying capacity.

A large number of concentrated conductor turns also presents problems in injecting such turns into the slots of the magnetic core. Large slot fill increases the probability of turns of conductors being inadvertently moved outside the insulating wedges which are utilized to electrically insulate the conductors in a slot from the bore of the core. Also, an increase in injection pressure is often required to insert the large number of conductor turns into the slots thereby increasing the likelihood of damage to the wire or conductor turns.

It is, therefore, an object of the present invention to provide an induction motor and methods for fabricating same in which the peak end turn factor of windings thereof is reduced to facilitate mounting of the motors.

A further object of the present invention is to provide new and improved methods of fabricating single phase induction motors which facilitate winding placement and minimize or eliminate damage to the windings during placement.

A still further object of the present invention is to provide an improved single phase induction motor and method of fabricating the same in which more desirable winding harmonics is achieved.

An additional object of the present invention is to provide an improved single phase induction motor wherein the winding harmonics can be reduced and/or distributed in a manner whereby improved operation of the motor is realized.

SUMMARY OF THE INVENTION

In carrying out the present invention in one form thereof, a method of operating a single phase induction motor is provided wherein the motor includes a stator assembly having a main winding, a start winding and an auxiliary winding for developing electromagnetic fields when energized. In one form, improved operating efficiency of the motor is accomplished by maximum utilization of all the windings during both the start and run modes or conditions of the motor. This form of the invention involves disposing the start and auxiliary windings on a magnetic core of the stator assembly, and providing a first series electrical connection between the start and auxiliary windings causing current flow in a first direction through the auxiliary winding during the start condition for producing a magnetic field which tends to be in a bucking magnetic relationship to the magnetic field produced by the start winding during the starting condition. This increase the resistance of the combined windings facilitates starting of the motor. During the run condition of the motor, a second series connection between the start and auxiliary windings causes current to flow through the auxiliary winding in a direction opposite the first direction thereby causing the magnetic field produced by the auxiliary winding to be in an aiding relationship to the magnetic field produced by the start winding. Thus, both the auxiliary and start windings are utilized during the run condition of the motor to improve operating efficiency.

In carrying out the present invention in another form, a single phase induction motor with an improved efficiency is provided which includes a magnetic core, a main winding, a start winding, and an auxiliary winding. The main winding is energized by a single phase power source and selectively connected in parallel with two different connection arrangements of the auxiliary and start windings. A switching device such as, for example, a current relay, is provided to establish a first series connection between the auxiliary and start windings during the start condition of the motor, whereby current flow is established in a first direction through the auxiliary winding to produce a magnetic field which tends to be in a magnetically bucking relationship to the magnetic field produced by the start winding. The switching device is also operable to establish a second series connection involving the auxiliary and start windings and a capacitor during the run condition of the motor. The second series connection causes current flow through the auxiliary winding in a direction opposite the first direction whereby a magnetic field is produced by the auxiliary winding which is in an aiding relationship to the magnetic field being produced by the start winding. Thus, the motor is operable as a resistance start, capacitor run motor with the above-described electrical connections providing for maximum utilization of the windings during both the start and run conditions, thereby improving motor operating efficiency.

In another aspect of the present invention, a single phase induction motor is provided having main, auxiliary and start windings disposed on a magnetic core. The auxiliary and start windings are provided with predetermined numbers of effective turns, $n_a$ and $n_s$, respectively, with the combined or net effective turns, $n_{sas}$, therebetween during the start condition of the motor being less than the effective turns $n_s$ of the start winding. During the run condition of the motor, the auxiliary and start windings are electrically connected so that their combined or net effective turns $n_{sar}$ is greater than the effective turns $n_s$ of the start winding.

In still another aspect of the invention, a typical resistance start induction run motor having an auxiliary winding, such as a backlash winding for providing additional resistance for motor starting, is converted to a capacitor run motor without the necessity of expensive motor redesign, and without the addition of external resistance or other starting aids to provide an acceptable starting torque, a problem which is inherent in many typical capacitor run motors. The connection arrangement of the start and auxiliary windings results in increased utilization of the windings of the motor so as to improve efficiency. During the start mode, a first series connection arrangement between the start winding and auxiliary winding provides current flow through the windings in a relative direction so as to provide bucking magnetic fields and resistance for starting of the motor. During the run mode, a second series connection is established between the start and auxiliary windings with a capacitor connected in series therewith so as to provide capacitor run operation of the motor. Improved motor operating efficiency is accomplished in that the second series connection arrangement provides for current flow through the auxiliary winding in a direction establishing a magnetic field having the same direction as the magnetic field produced by the start winding. Furthermore, with the improved connection arrangement, increased motor operating efficiency is accomplished and the capacitive requirements are minimized, thereby reducing the costs previously associated with attaining a higher efficiency motor.

Yet another form of the present invention is concerned with a method for fabricating a resistance start, single phase induction motor including a magnetic core, a main winding, a start winding comprising at least three coils, and an auxiliary winding wherein the combined resistance of the start and auxiliary windings is utilized for motor starting. The method involves fabricating the auxiliary winding by developing at least three different coils of conductor turns and disposing these coils in at least six different slots of the magnetic core whereby each of the three coils occupies slots also occupied by at least one coil of the start winding.

Another aspect of the invention is concerned with selecting the number of conductor turns for each of the aforementioned three coils of the auxiliary winding in accordance with the area available within the slots of the magnetic core into which the auxiliary and start windings are to be inserted, whereby a predetermined "coil injection factor" is not exceeded in the simultaneous insertion of coils of the auxiliary and start windings so that damage to the conductors of the different coils is minimized. "Coil inject factor" is the measure of tightness of the auxiliary and start windings. It is the ratio of the auxiliary and start conductor in a given slot to the slot area made available to the auxiliary and start windings in the slot.

Still another aspect of the above-described method of fabricating a single phase induction motor involves selecting the number of conductors in each of the at least three coils of the auxiliary winding so as to more uniformly distribute the end turns of the coils of the auxiliary and start windings thereby producing a more uniform end turn profile about at least one face of the core to facilitate mounting of the motor.

Yet another aspect of the above-described method of fabricating a single phase induction motor is concerned with distributing the number of conductors required for the auxiliary winding in each of the at least three coils so as to provide an optimum distribution of turns for reducing or controlling primarily the effects of third and fifth harmonics of the start winding. Higher harmonics can also be controlled in this manner.

In a further form of the present invention, an improved resistance start, single phase induction motor is provided wherein the motor includes a magnetic core, a main winding, a start winding and an auxiliary winding. The winding turns of the auxiliary winding are disposed on the magnetic core relative to winding turns of the start winding so as to be in a magnetic bucking relationship to the start winding during the starting condition of the motor, and the combined resistance of the start and auxiliary windings is utilized to provide resistance start for the motor. With the improved single phase motor, the auxiliary winding comprises at least three coils distributed in at least six different slots of the magnetic core with each of the three coils sharing a slot of the magnetic core with at least one coil of the start winding. Another aspect of the improved motor, the conductor turns of the auxiliary winding may be distributed in the three coils so as to reduce the third and fifth harmonic effects of the start winding coils. In still another aspect of the improved motor, the distribution of the conductor turns of the auxiliary winding in the at least three coils may be selected in accordance with the area available within the slots for accepting simultaneously inserted start and auxiliary winding coils while minimizing damage to the coils. Also, a reduced end turn profile about one face of the coil is achieved so as to reduce peak areas whereby less winding damage and therefore longer motor life of the single phase induction motor is facilitated.

BRIEF DESCRIPTION OF THE DRAWINGS

FIG. 1 is a simplified schematic diagram of a motor embodying the present invention in one preferred form thereof with the windings being shown connected in a run mode;

FIG. 2 is a simplified schematic diagram of the motor of FIG. 1 with the windings connected in a start mode of operation;

DESCRIPTION OF THE PREFERRED EMBODIMENTS

Figure 3:
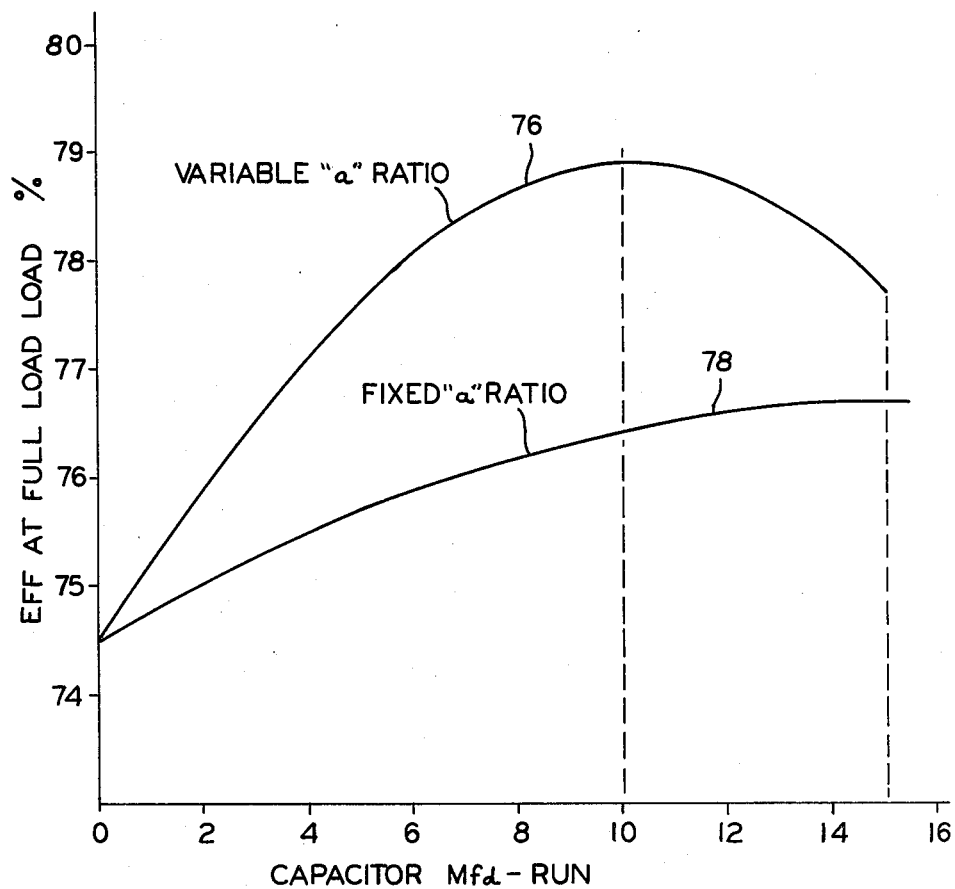
FIG. 3 is a graph of efficiency versus capacitance value for a resistance start, capacitor run motor employing the teachings of the present invention compared with the same resistance start, capacitor run motor not utilizing the teachings of the present invention.

Referring now to the drawings, FIG. 1 illustrates schematically a motor according to the present invention in the mode run of operation, and FIG. 2 illustrates the same motor 10 in the start mode of operation. The motor 10 comprises a conventional squirrel cage rotor 12, a primary or main winding 14, a start winding 16, and an auxiliary winding 18. It will be seen that the connection arrangements shown in FIGS. 1 and 2 illustrate utilization of the auxiliary winding 18 during both the start and run modes of operation with the auxiliary winding 18 and start winding 16 being connected in two different series arrangements during the start and run modes so that current flow $I_s$ through auxiliary winding 18 during the start mode of operation is in a first direction (FIG. 2), and is in the opposite direction (FIG. 1) during the run mode of operation. In the start mode of operation, the magnetic fields produced by the start winding 16 and auxiliary winding 18 are in a bucking relationship to each other, and in the run mode, are in an aiding relationship.

The two different series interconnection arrangements between start winding 16 and auxiliary winding 18 are established by a current relay device comprising coil 20 in series with main winding 14, normally open relay contacts 22 and 24, and normally closed relay contacts 26 and 28. During start conditions, the current flow through main winding 14 and relay coil 20 is high, and the magnetic field produced by coil 20 causes contacts 22 and 24 to close and contacts 26 and 28 to open. When the motor has reached a certain speed, such as, for example, running speed, the current flow through coil 20 is lower so that the magnetic field produced thereby is also lower, and contacts 22 and 24 are caused to open while contacts 26 and 28 are caused to close. Relays of this general type are well known in the art of induction motors.

The motor 10 comprises five lead wires 30, 32, 34, 36 and 38, which extend externally to the motor and with lead wire 32 connected to the start winding 16 over wire 40 into the main winding 14 over wire 42. Lead wire 32 is connected to one side L1 of a power source (not shown), which may be, for example, 115 volt, 60 hertz. Lead 34 is connected to one terminal of contact 22 by wire 44 and to one contact of terminal 26 by wire 46. Lead wire 36, which is connected to auxiliary winding 18, is connected by wire 48 to the other terminal of contact 26, and is also connected to one terminal of contact 24 by wire 50. The other lead wire 38 for auxiliary winding 18 is connected to the other terminal of contact 22 over wire 52, and to one terminal of run capacitor 54 over wire 56. The other terminal of run capacitor 54 is connected to one terminal of contact 28 by wire 58, and the other terminal of contact 28 is connected to the other side L2 of the power source by wire 60. The main winding lead wire 30 is connected to one side of current relay coil 20. The other side of coil 20 is connected to the other terminal of relay contact 24 and to the L2 side of the power source by wire 62.

In operation, the current relay contacts 22, 24, 26 and 28 are initially in the state as indicated in FIG. 1. When electrical power is applied to leads 30, 32, 34, 36 and 38, the high current through coil 20 causes the contacts 22, 24, 26 and 28 to assume the positions shown in FIG. 2, and windings 14, and 16–18 produce rotating, spaced apart magnetic fields which cause rotational movement of the rotor 12. During this start condition (FIG. 2), start winding 16 and auxiliary winding 18 are connected in series arrangement caused by closed contacts 22 and 24 so as to cause the start current $I_s$ to flow through auxiliary winding 18 in the direction indicated in FIG. 2. Current flow through auxiliary winding 18 in this direction causes a magnetic field which tends to oppose the magnetic field being produced by the current through start winding 16, i.e., the magnetic fields of the start winding 16 and auxiliary winding 18 are in a bucking relationship relative to each other during the starting condition. During the start condition, the current relay coil 20, which is in series with main winding 14, senses the current flow therethrough in order to maintain the associated relay contacts in the conditions shown in FIG. 2 until the motor has reached a predetermined speed, at which the current through coil 20 will have dropped to a known lower level. As is well known in the art, the combined resistance of the start winding 16 and auxiliary winding 18 causes a time phase difference in the current through these windings relative to the current flowing through main winding 14, which, in turn, produced displaced magnetic fields which cause rotation of the rotor 12.

As the rotational speed of rotor 12 increases, the current through main winding 14 and, thus, through relay coil 20, decreases until a predetermined level is reached. At this time, coil 20 causes relay contacts 22 and 24 to open and contacts 26 and 28 to close. At the same time, capacitor 54 is connected in series with the series connected start winding 16 and auxiliary winding 18 is shown in FIG. 1. During this run condition of the motor 10, $I_r$ flows through start winding 16, closed contacts 26, auxiliary winding 18, capacitor 54 and closed contacts 28 in the direction indicated. This current $I_r$ flows through auxiliary winding 18, during the run condition, in the opposite direction of the flow $I_s$ during the start condition (FIG. 2), thereby causing auxiliary winding 18 to produce a magnetic field which tends to aid the magnetic field produced by start winding 16.

The reversal of current flow through the auxiliary winding 18 between the start and run conditions of the motor provides increased motor operating efficiency during the run condition by effectively utilizing the magnetic field produced by auxiliary winding 18 to cause rotation of rotor 12. Furthermore, economic savings are realized in that a smaller value of capacitance for capacitor 54 can be utilized, yet maintaining improved operating efficiency for the motor 10 in the run condition over that of an ordinary resistance split phase motor.

Figure 4:
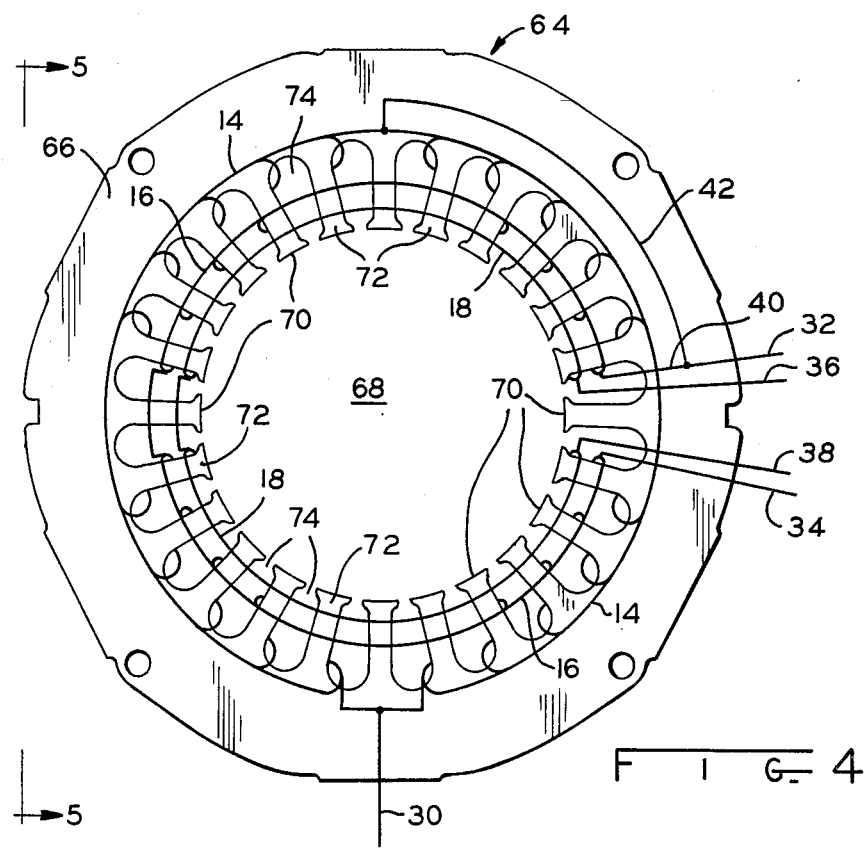
FIG. 4 is a front elevational view of a stator assembly diagrammatically illustrating a winding arrangement for a single phase induction motor which may be utilized in practicing the present invention in one preferred embodiment.

FIG. 4 illustrates a stator assembly 64 for the motor 10 shown in FIGS. 1 and 2 comprising a slotted magnetic core 66 having a bore 68 extending through the center thereof with the bore being defined by tips 70 with a plurality of teeth 72. The stack height for core 66 is 1.50 in. and there is established an air gap of 0.0115 in.

between the tips 70 of teeth 72 and the rotor 12, which is not shown in FIG. 4 for the sake of clarity. Teeth 72 establish therebetween axially extending slots 74, which accommodate the turns of the main winding 14, start winding 16 and auxiliary winding 10. Although the magnetic core 66 which is illustrated comprises twenty-four axially extending slots 74, it will be understood that the present invention could be utilized with a magnetic core having any number of slots.

The illustrated winding arrangement is for a two-pole, one-fifth horsepower motor having an operating voltage of 115 volts, 60 hertz and a rated speed of 3450 rpm. Each of the windings illustrated in FIG. 4 is formed of two coil groups disposed on the core 66, and although each coil is depicted, for the sake of clarity, as a single turn of a conductor, each of the coils comprises multiple turns of a conductor, and the coils of one pole are identical to the oppositely disposed coils of the other pole.

Main winding 14 comprises five coil groups, wherein the number of turns in each of the coil groups, commencing with the innermost coil to the outermost coil, being 23 turns, 29 turns, 30 turns, 37 turns and 37 turns. The conductor utilized to form the winding turns is of insulated aluminum having a diameter of 0.0403 inches, with a resistivity at 25° C. of 6.496 ohms per 1000 feet, and wherein the total resistance for each of the main winding groups is 0.970 ohms per pole. The number of effective turns in each main winding coil group 14 ($n_m$) is 121.12.

As illustrated, the main winding 14 is formed such that the coil groups are connected in parallel and have leads 30 and 32 extending from the stator assembly 64.

Start winding 16 is also formed as two coil groups, with each coil group being identical and having four serially connected coils to form the coil group. Specifically, commencing with the innermost start coil and proceeding to the outermost coil, they are formed of 20 turns, 28 turns, 32 turns and 74 turns. The conductor is made of insulated copper having a diameter of 0.0179 inches, a resistivity at 25° C. of 32.90 ohms per 1000 feet, and a total resistance in each of the coil groups of 6.45 ohms per pole. The two coil groups of the start winding 16 are connected in series and have lead wires 32 and 34 extending from the stator assembly 64. The effective number of turns of each coil group of the start winding 16 is 90.72.

Auxiliary winding 18 is also formed of two coil groups wherein the coils are connected in series. Each coil group comprises 47 winding turns of the same 0.0179 inch conductor as was the case with start winding 16. The effective winding turns of each coil of auxiliary winding 18 are 46.60. Lead wires 36 and 38 for auxiliary winding 18 extend from the stator assembly 64.

The stator assembly shown in FIG. 4 may be utilized in a conventional resistance split phase motor, that is, a resistance start, induction run motor. The improved operating performance of the motor may be improved substantially, however, without altering the turns distribution of the windings for the core configuration, if the leads 30, 32, 34, 36 and 38 are interconnected in the manner illustrated in FIGS. 1 and 2. FIG. 3 is a graph showing the improved operating performance accomplished by such an innerconnection of the windings of FIG. 4. The graph charts the motor operating efficiency at different values of capacitor 54 wherein curve 76 shows the motor operating performance utilizing the innerconnection arrangement of FIGS. 1 and 2, and curve 78 illustrates the motor performance achieved by simply connecting a capacitor of the value as indicated in series with the start winding and connecting the start winding 16 and auxiliary winding 18 as in FIG. 2 only.

As illustrated by the graph of FIG. 3, the inner connection arrangement of FIGS. 1 and 2 produces an improved operating efficiency of the motor at 1.5 full load while utilizing a 10 microfarad capacitor of 4.4% points, that is, the efficiency of the motor is increased from 74.5% to 78.9%. It can also be seen that the connection arrangement according to the present invention accomplishes an improved operating efficiency over an arrangement which simply adds a capacitor in series with the start and auxiliary windings 16 and 18 of 2.5% points.

Furthermore, the connection arrangement of FIGS. 1 and 2 results in a peak operating efficiency at a lower value of capacitor 54 than is the case if a capacitor were simply connected in series with the start and auxiliary windings, thereby permitting a savings in capacitor size and cost while still obtaining increased operating efficiency. Specifically, the motor connected with a fixed series capacitor producing curve 78 attains its peak operating efficiency with a 15 microfarad capacitor, whereas the motor connected in accordance with FIGS. 1 and 2 obtains its peak operating efficiency with a 10 microfarad capacitor.

By utilizing the inner connection arrangement illustrated in FIGS. 1 and 2 with the stator assembly illustrated in FIG. 4, a single phase induction motor having a variable "a" ratio, that is, the ratio of the number of effective turns of the start and auxiliary windings to the number of effective turns of the main winding, is produced. During the start condition of the motor, an "a" ratio of 0.749 is achieved by this inter connection arrangement. During the run condition of the motor, wherein the current flow through the auxiliary winding 18 is reversed, the effective turns of the start and auxiliary windings 16 and 18 are increased, thereby producing an "a" ratio of 1.485. The lower value of the "a" ratio during the start condition of the motor facilitates starting, whereas the higher "a" ratio during the run condition, improves motor operating performance.

In a capacitor run motor, the voltage across the run capacitor is essentially directly proportional to the "a" ratio, so that by increasing this ratio, the higher voltage across capacitor 54 permits a reduction in the capacitance value necessary to obtain peak operating efficiency of the motor in the capacitor run mode because the reactive volt-amperes (vars) supplied by the capacitor is proportional to the square of the voltage across the capacitor. Furthermore, by increasing the combined effective turns of the start winding 16 and auxiliary winding 18 during the run condition of the motor, more turns are available for producing motor torque.

In motors specifically designed for capacitor run operation, it has been standard practice to provide a winding interconnection arrangement which is designed to obtain optimum operating efficiency for a given size of capacitor; i.e., the motor is designed to approach a 90° lead of current of the start winding circuit from the current of the main winding circuit, and thus tend to simulate two phase motor operation. In contrast, the connection arrangement according to the present invention provides improved motor operating performance for a motor which is conventionally designed for resistance start, induction run operation, and does so without the necessity for completely redesigning the motor. Although the interconnection arrangement may not achieve optimum phase displacement between the currents of the main and start winding circuits such as to completely simulate two phase motor operation, the arrangement illustrated herein is able to effectively utilize all of the windings of the motor circuit of a conventional resistance start, induction run motor without the necessity of major redesign for capacitor run operation. In other words, the start and auxiliary windings are 100% active or energized during start and run.

In the embodiment of the invention described above, the current in the start winding 16 and auxiliary winding 18 circuit during run operation leads the current in main winding 14 by approximately 75°. Although this is not at the optimum of 90° necessary to simulate two phase operation, such an interconnection arrangement at a minimum of cost and without major redesigning, substantially improves the motor operating efficiency of the conventional resistance start, induction run motor, and enables improved efficiency without sacrificing starting torque.

In another actual reduction to practice of the invention, a one-half horsepower, single phase induction motor rated at 3450 rpm, 115 volts, and 60 hertz was built utilizing the interconnection arrangement illustrated in FIGS. 1 and 2. The main winding was wound substantially as main winding 14 as illustrated in FIG. 4, with each coil group comprising five coils and the number of coils from the innermost to the outermost coil comprising 11 turns, 18 turns, 24 turns, 27 turns, and 29 turns.

The start winding also comprised two coil groups serially connected, with each coil group comprising four coils having 18 turns, 23 turns, 26 turns, and 61 turns, respectively, from the innermost to the outermost coil. The auxiliary winding was formed by winding two coils and serially interconnecting these coils, with each coil comprising 33 turns of conductor.

The motor was first tested for operation as a conventional resistance start, induction run motor and then tested with the windings interconnected in the manner illustrated in FIGS. 1 and 2. At full load, the motor in the conventional arrangement, i.e., as an induction run motor, showed an operating efficiency of 72.8%. When the motor was connected as illustrated in FIGS. 1 and 2, it had an operating efficiency of 78.8%. At 1.5 full load, the motor operated as a conventional resistance start induction run motor at an operating efficiency of 72.4%, and when connected as shown in FIGS. 1 and 2, the motor had an operating efficiency of 77.5%, with a 10 microfarad capacitor connected as illustrated in FIGS. 1 and 2.

Although the schematics of FIGS. 1 and 2 illustrate a current relay being utilized to switch the motor from the start condition to the run condition, it will be readily apparent that other means to accomplish such switching could be utilized, such as centrifugal switches and voltage relays. Furthermore, the present invention is not limited to the particular stator core or slot configuration illustrated in FIG. 4, but may be utilized with any number of slot or core configurations to achieve the improved operating efficiencies.

The particular winding arrangement illustrated in FIG. 4 is a winding arrangement for a conventional resistance start induction run motor with the auxiliary winding 18 being formed by what is termed in the art as backlash winding, that is, the auxiliary winding is wound or has been wound after the start winding by reversing the direction of winding. However, it will be readily apparent that the auxiliary winding 18 could be formed separately from the start winding 16 during the winding process, and disposed separately on magnetic core 66 in order to produce the opposing magnetic field during start conditions and an aiding magnetic field during run conditions.

Figure 5:
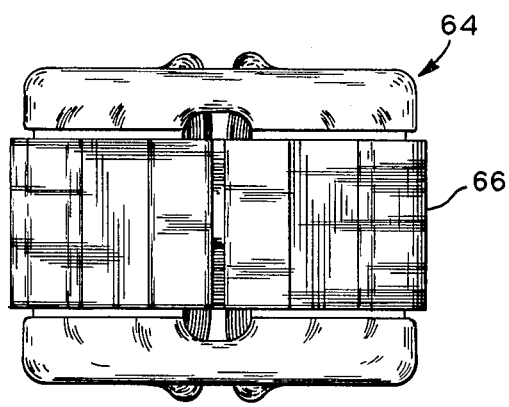
FIG. 5 is a side view of the stator assembly of FIG. 4 illustrating the winding end turn profile for the assembly.

As discussed above, one of the problems with two pole motors having backlash windings is the very large concentration of turns in certain of the slots, and the large concentration of end turns around certain of the teeth. This is because the backlash of auxiliary windings have generally been limited to two coils, one for each pole of the motor. In the coil configuration illustrated in FIG. 4 and discussed above, for example, the slots containing the outermost start and auxiliary coils had a start and auxiliary slot fill of 121, which is quite high and results in considerable frictional forces when the coils are inserted. Furthermore, the end turn configuration, which is illustrated in FIG. 5, has a large end turn factor causing many of the end turns to protrude. This is particularly a problem when aluminum wire is utilized for some or all of the windings rather than copper wire because of the large wire diameter required for the same resistance when using aluminum wire.

Figure 6:
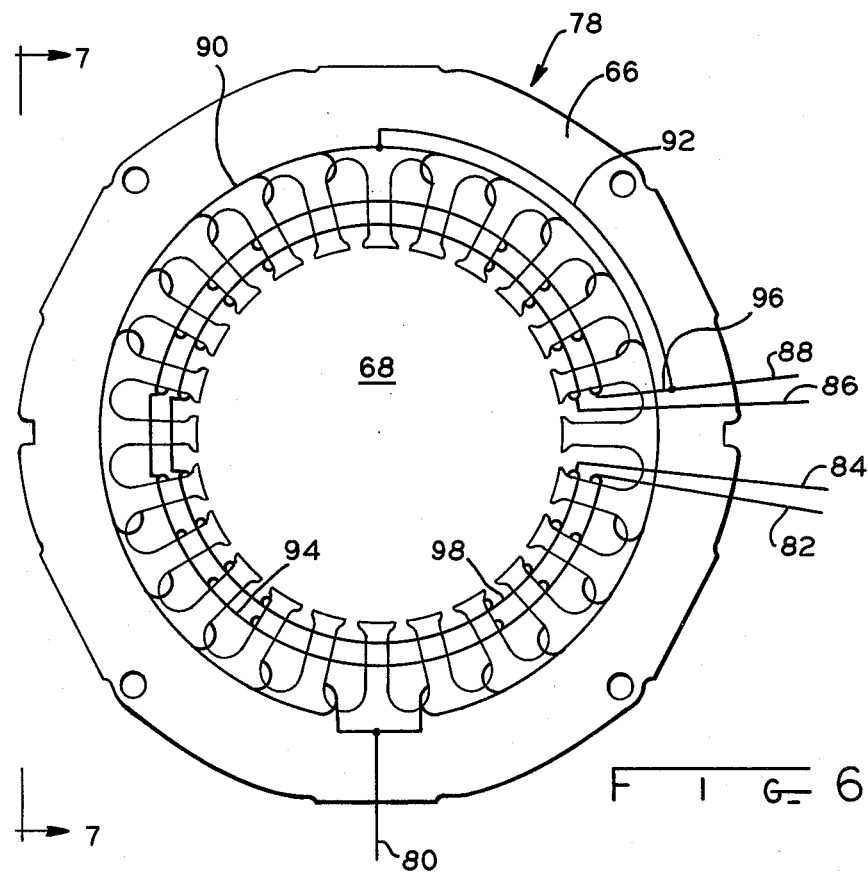
FIG. 6 is a front elevational view of a stator assembly for a single phase induction motor embodying the present invention in another preferred form with the windings thereof being diagrammatically illustrated.

FIG. 6 illustrates a stator core assembly 78 having a winding distribution in accordance with a second embodiment of the invention. As was the case with the previous embodiment, the stator similarly has five external leads 80, 82, 84, 86 and 88, which correspond to leads 30, 34, 38, 36 and 32, respectively, in the stator assembly 64 illustrated in FIG. 4. The corresponding leads in FIGS. 4 and 6 are interconnected in the same manner, that is, as shown in FIGS. 1 and 2 so as to attain the variable "a" ratio with its associated increases in motor efficiency and starting torque.

Main winding 90, which is connected to lead 88 by wire 92 and to lead 80, comprises two coil groups for the two poles of the motor. Each coil group comprises, commencing at the innermost coil to the outermost coil, 33 turns, 47 turns, 60 turns, 80 turns and 80 turns. The main winding 90 is of aluminum wire having a diameter of 0.0359 in. with a resistivity of 13.05 ohms per 1000 feet at 25° C., and the total resistance for each coil group making up the main winding 90 is 3.915 ohms per pole. The number of effective turns in each main winding coil group ($n_m$) is 121.0 for parallel connected poles.

Stator assembly 78 also includes the start winding 94 comprising two coil groups, which are connected in parallel to lead 88 by means of wire 96 and to lead 82. Each of the coil groups comprises four series connected coils having 51 turns, 43 turns, 53 turns and 28 turns, commencing from the innermost coil to the outermost coil. The coils are of copper wire having a diameter of 0.0179 in., a resistivity of 32.90 ohms per 1000 feet at 25° C., and the total resistance for each of the coil groups for start winding 94 has a total resistance of 4.752 ohms per pole. As illustrated, the coil groups for start winding 94 are series connected, and have 141.89 total effective turns ($n_s$).

It will be recalled that in the previous embodiments, the auxiliary winding 18 comprised two coil groups wound in only four slots of the magnetic core 66. In the embodiment of the invention previously being discussed, however, the auxiliary winding 98 is distributed in the same slots as the start winding 94, but is reverse wound or disposed so that the magnetic field produced thereby is in a bucking relationship to the start winding 94 when the leads 80, 82, 84, 86 and 88 are connected in the manner illustrated in FIG. 2. Specifically, auxiliary winding 98 comprises two coil groups connected in series wherein each of the coil groups is made up of four coils having 26 turns, 16 turns, 21 turns, and 3 turns, commencing with the innermost coil to the outermost coil, and have 50.90 total effective turns. Auxiliary coil 98 is of copper wire having a diameter of 0.0179 in., and a resistivity of 32.90 ohms per 1000 feet at 25° C., and wherein the total resistance of each of the coil groups of auxiliary winding 98 is 1.705 ohms per pole at 25° C.

Figure 7:
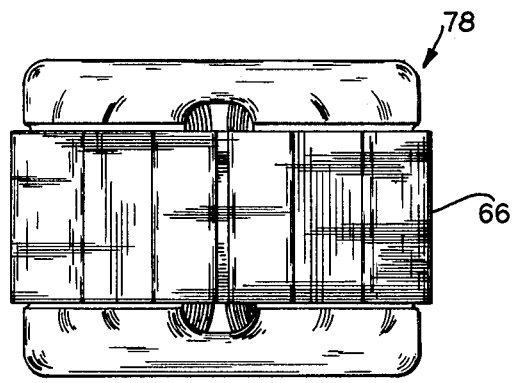
FIG. 7 is a side view of the stator assembly of FIG. 7 illustrating the winding end turn profile for the assembly.

By distributing the backlash for auxiliary winding 98 in all four slots occupied by start winding 94, rather than in just the slots of the outermost coils in each of the groups, the peak end turn factor can be significantly reduced, and the coil inject factor can be maintained within acceptable limits. Whereas, in the embodiment illustrated in FIG. 4, where the outside coil of start winding 16 and the outside coil of auxiliary winding 18, which share common slots, have a combined total of 121 turns of wire, by distributing the auxiliary winding 98 as shown in FIG. 6, the respective outside coils of start winding 94 and auxiliary winding 98 have a combined total of only 31 turns. Start winding 16 and start winding 94 have essentially the same resistance and effective turns, as do auxiliary windings 18 and 98. The effect of reducing the end turn factor is illustrated in FIG. 7 where it can be seen that the end turns do not protrude to the same degree that they do in FIG. 5 and, thus, forming or squeezing the end turns to conform to a given shape or size can be more readily accomplished with less damage to the conductors. This is particularly advantageous when the motor is utilized in a hermetic compressor where available space is at a premium.

Given the coil distribution of main winding 90, two stators were wound, one having the start and auxiliary winding distribution of FIG. 4, and the other having the start and auxiliary winding distribution of FIG. 6. The following table illustrates the reduction in the end turn areas at tooth locations 10, 11, 12, and 13 of core 66, wherein the values are given in circular mils in a cross section taken along the centerline of each of the teeth.

| Tooth | 10 | 11 | 12 | 13 |
|---|---|---|---|---|
| Present (cma × $10^{-3}$) | 394.8 | 452.0 | 487.1 | 437.7 |
| Proposed (cma × $10^{-3}$) | 387.9 | 432.3 | 450.3 | 437.7 |
| Change (cma × $10^{-3}$) | −6.9 | −19.7 | −36.8 | 0 |
| % Change | | −1.8% | −4.4% | −7.6% | 0 |

As indicated previously, the distribution of auxiliary winding 98 was selective so that the coil inject factor in the stator slots would be within acceptable limits. In the embodiment of FIG. 6, the coil inject slot fullness factors were predetermined to be 50%, 45% and 40% in the first three coils. Additionally, the outside start coil injection factor was reduced from 35.5% to 12.5%, which is believed to significantly reduce the problems of wires being disposed between the slot wedges and the bore 68 of the magnetic core 66. It will be recalled that the outer coils of the start winding 94 and auxiliary winding 98 in the previous embodiment had the highest concentration of turns, so that the percentage reduction in coil injection factor for these turns is very significant in avoiding problems associated with proper injection of the windings into the stator slots.

It is preferred that the auxiliary winding 98 be wound as a separate pole from start winding so that the net forward turns would be 25 turns, 27 turns, 32 turns and 25 turns, commencing from the innermost start and auxiliary coils to the outermost start and auxiliary coils for each pole. The harmonic contents for such a distribution is −0.7% for the third harmonic and −4.9% for the fifth harmonic. The harmonic contents for the start winding 16 and auxiliary winding 18 of the embodiment shown in FIG. 4 is −2.9% for the third harmonic and −4.7% for the fifth harmonic, so that the embodiment of FIG. 6 represents a substantial reduction in the third and fifth harmonics. By further altering the distribution of the start winding and auxiliary winding coils, other harmonics can be achieved, a situation which was not possible in the case of prior art backlash winding distributions wherein the winding was contained in only two slots.

The primary advantages of the proposed winding distribution illustrated in FIG. 6 are more desirable winding harmonics, lower peak end turn factor and reduced winding losses resulting from excessive pressure and wire breakage, and lower outside coil injection factor in the slots. The last advantage results in fewer "wire over wedge" problems as discussed above.

It is intended that the stator assembly 78 be substituted for stator assembly 64 in the interconnection arrangement shown in FIGS. 1 and 2 for the run and start conditions, respectively. The motor would be a one-fifth horsepower motor having an operating voltage of 115 volts, 60 hertz, and a rated speed of 3450 rpm. The "a" ratio during start conditioning is 0.752, and the "a" ratio during run conditions is 1.593.

When the stator assembly of FIG. 6 is fabricated, the desired start winding forward turn distribution to provide the desired magnetic characteristics is determined, and a coil inject factor in accordance with the area available within the slots of the core 66 after the main windings 90 have been injected is selected so as to minimize conductor damage during insertion. The total resistance of the start winding 94 and auxiliary winding 98 required to provide for resistance starting is determined also. The four start coils 94 and the four auxiliary coils 98 are developed by performing reverse turns of the conductor so that the net forward turns of the combined start and auxiliary windings equals the desired number of forward turns necessary to achieve the necessary effective turns for starting of the motor. The forward turns of the start winding 94 in excess of the desired number are magnetically cancelled by an equal number of reverse turns in the auxiliary winding 98, and the total number of turns in each of the slots occupied by the start winding 94 and auxiliary winding 98 is selected to provide a total desired resistance and to enable substantially simultaneous insertion of both the start and auxiliary windings without exceeding the coil injection factor, so as to minimize conductor damage during insertion.

It is often desirable that the combined start and auxiliary windings be distributed sinusoidally so as to reduce the harmonics of the start and auxiliary windings. Such a distribution will also be effective in reducing the end turn factor.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed as new and is desired to be secured by Letters Patent of the United States is:

1. A single phase induction motor comprising: a magnetic core, a main winding disposed on the magnetic core and being adapted for connection to a single phase power source, a start winding disposed on the magnetic core and being adapted for connection to the single phase power source, an auxiliary winding disposed on the magnetic core and adapted for connection to the single phase power source, capacitive means and switching means for establishing a first series connection between the start winding and the auxiliary winding during a start mode of the motor so that current flow through the auxiliary winding establishes a magnetic field which opposes a magnetic field substantially simultaneously established by current flow through the start winding and for establishing a second series connection between the start winding and the auxiliary winding during a run mode of the motor with the second series connection including said capacitive means electrically connected in series with both the auxiliary and start windings, and wherein the second series connection is such that current flow through the auxiliary winding during the run mode of the motor is in a direction opposite to the direction of current flow during the start mode so as to cause the auxiliary winding to establish a magnetic field which is additive to the magnetic field established by the start winding during the run mode, said first and second series connections of said start and auxiliary windings being in parallel with said main winding.

2. The motor of claim 1 wherein the switching means includes a current operated means responsive to current flow in the main winding for establishing the first series connection during the start mode of the motor and for establishing the second series connection during the run mode of the motor.

3. The motor of claim 2 wherein said current operated means comprises a current activated relay having a plurality of normally open contacts and a plurality of normally closed contacts.

4. A single phase induction motor comprising a magnetic core having a main winding, a start winding and an auxiliary winding disposed thereon for producing magnetic fields during a start condition and run condition of the motor, said start winding and auxiliary winding being disposed on the magnetic core and electrically connected for energization during the start condition of the motor to produce magnetic fields during the start condition which are in a bucking relationship and said start and auxiliary winding being disposed on the magnetic core and electrically connected for energization during the run condition of the motor to produce magnetic fields during the run condition which are in an additive relationship, whereby the motor may be operated as a resistance start motor and as a capacitor run motor with improved operating efficiency.

5. The induction motor of claim 4 wherein both the start winding and the auxiliary winding comprise multiple turns of conductive wire with the start winding comprising multiple forward turns of a conductive wire and with the auxiliary winding comprising multiple reverse turns of a conductive wire.

6. The induction motor of claim 4 further including a switch means operative to cause current flow in a first direction through the auxiliary winding during the start condition of the motor so as to cause the auxiliary winding to produce a magnetic field which is in bucking relationship to a magnetic field produced by the start winding and operative to cause current flow in a second direction which is opposite said first direction during the run condition of the motor so as to cause the magnetic field produced by the auxiliary winding during the start condition to be in additive relationship to the magnetic field produced by the start winding.

7. The induction motor of claim 6 wherein said switch means includes a relay responsive to current in the main winding for controlling direction of current flow in the auxiliary winding during the start and run conditions of the motor.

8. In an induction motor operable in a start condition and in a run condition and comprising: a magnetic core for accommodating winding turns thereon; a main winding having a predetermined number of effective winding turns $n_m$ of conductor on the magnetic core; a start winding having a predetermined number of effective winding turns $n_s$ of conductor on the magnetic core and adapted for energization during both start and run conditions of the motor; an auxiliary winding having a predetermined number of effective winding turns $n_a$ of conductor on the magnetic core and adapted for energization during both the start and run conditions of the motor; said auxiliary winding having its predetermined number of effective turns $n_a$ arranged and electrically connected to the start winding during the start condition of the motor so that the combined net effective winding turns $n_{sas}$ of the start winding and the auxiliary winding during the start condition is less than the effective turns $n_s$ of the start winding; and said auxiliary winding having its predetermined number of effective winding turns $n_a$ arranged and electrically connected to the start winding during the run condition of the motor so that the combined net effective winding turns $n_{sar}$ of the start winding and the auxiliary winding during the run condition is greater than the effective turns $n_s$ of the start winding.

9. The induction motor of claim 8 wherein: the ratio of the combined effective turns $n_{sas}$ of the secondary and auxiliary windings during the starting condition to the effective turns $n_m$ of the main winding equals $a_s$, the ratio of the combined effective turns $n_{sar}$ of the secondary and auxiliary phase windings during the running condition to the effective turns $n_m$ of the main winding equals $a_r$; and wherein $a_s$, which is established during the starting condition of the motor, is less than $a_r$, which is established during the running condition of the motor.

10. A method of operating a single phase induction motor having a main winding, a start winding and an auxiliary winding adapted for excitation by a power source during a start condition and a run condition of the motor, a switching device responsive to the motor operation for moving its plurality of contacts between open and closed positions, and a capacitor connected in series with the start and auxiliary windings during a running condition of the motor, said method comprising: connecting the main winding across the power source; interconnecting the start winding and the auxiliary winding in alternative first and second series circuits by way of contacts of the switching device with said second series circuit including the capacitor connected in series with the start and auxiliary windings;

connecting the first and second series circuits across the power source; energizing the main winding and the first series circuit from the power source to effect starting of the motor and permitting current to flow in a first direction through the auxiliary winding; actuating the switching device for moving contacts thereof so as to deactivate the first series circuit and to activate the second series circuit; and continuing energization of the motor generally at a running speed in response to excitation of the main winding and the second series circuit with current flowing through the auxiliary winding in a direction opposite said first direction and through the capacitor.

11. The method of claim 10 wherein said switching device includes a current relay having a plurality of contacts and a current sensing coil and the method further comprises connecting a current sensing coil in series with main winding for sensing current flow through the main winding and for actuating the contacts at a predetermined current through the main winding.

12. A single phase induction motor including a slotted magnetic core having a main winding, a start winding, and an auxiliary winding disposed thereon with the start and auxiliary windings being series connected and having a resistance sufficient to provide for resistance starting, the induction motor further comprising: the auxiliary winding comprising multiple turns of a conductor wound and disposed within slots of the magnetic core so as to be in magnetic offsetting relationship with conductor turns of the start winding; said auxiliary winding comprises at least three coils with each coil comprising at least one turn of a conductor and the at least three coils being disposed within at least six slots of the core with the at least six slots also being occupied by coils of the start winding, whereby distribution of the coils of the auxiliary winding within the at least six slots reduces the end turn factor about at least one face of the core so as to facilitate substantially simultaneous insertion of the auxiliary and start windings into the core and so as to facilitate easier forming of the end turns by minimizing the area occupied by end turns of the start and auxiliary windings about the at least one face of the magnetic core.

13. In a single phase, resistance start induction motor including a magnetic core having slots, a main winding, a start winding, an auxiliary winding, and wherein winding turns of the auxiliary winding are disposed on the core relative to winding turns of the start winding so as to be in a magnetic bucking relationship to a portion of the winding turns of the start winding during the starting condition of the motor and wherein resistance starting of the motor is provided by the combined resistance of the start and auxiliary windings, the improvement wherein: the auxiliary winding comprises at least three coils distributed in at least six different slots of one pole of the magnetic core with each of the at least three coils sharing a slot of the magnetic core with at least one coil of the start winding.

14. A method of fabricating a single phase induction motor including a slotted magnetic core having a main winding, a start winding, and an auxiliary winding disposed thereon wherein the start winding comprises a plurality of coils with said coils formed with forward turns of conductor and wherein the auxiliary winding comprises at least three coils wound and disposed in the core so as to magnetically offset a portion of the forward turns of at least three coils the start winding coils, said method comprising: determining a desired start winding forward turn distribution which yields the desired effective turns to provide desired magnetic characteristics upon energization; selecting a coil inject factor in accordance with area available within slots of the magnetic core for inserting coils of the start winding and the auxiliary winding after coils of the main winding have been inserted into slots of the magnetic core whereby said coil inject factor is selected so as to minimize conductor damage during insertion; determining the maximum number of conductors that can be inserted into each of the slots to be occupied by both a coil of the start winding and a coil of the auxiliary winding without exceeding the predetermined coil inject factor; determining total required resistance of the start and auxiliary windings which is desired to provide for resistance starting of the induction motor; developing each of said start winding coils by performing multiple forward turns of a conductor and developing each of the at least three coils of the auxiliary winding by performing reverse turns of the conductor with the net forward turns which is equal to the number of forward turns of the start winding minus the number of reverse turns of the auxiliary winding equaling the desired number of forward turns previously determined in accordance with that required to achieve the desired number of effective turns in the start winding; and wherein the forward turns of the start windings in excess of the desired number of forward turns in a slot are substantially magnetically cancelled by an equal number of reverse turns of the auxiliary winding with the number of excess turns and reverse turns disposed in each of the at least three slots being selected to provide the total desired resistance of the start and auxiliary winding and to provide for substantially simultaneous insertion of both the start and auxiliary windings in slots of the core without exceeding the coil injection factor thereby minimizing conductor damage during the insertion.

15. A method of fabricating a resistance start, single phase induction motor including a magnetic core having slots, a main winding, a start winding comprising at least three coils, and an auxiliary winding, wherein the combined resistance of the start and auxiliary windings is utilized for motor starting, the method comprising: fabricating the auxiliary winding by developing at least three different coils of conductor turns; and disposing the at least three different coils in at least six different slots of the magnetic core wherein each of the at least three coils occupies slots also occupied by at least one coil of the start winding.

16. The method of claim 15 and further including selecting the number of conductor turns for each of the at least three coils of the auxiliary winding in accordance with the area available within the slots of the magnetic core into which the auxiliary coil and the respective start winding coil are to be simultaneously inserted whereby coils of the auxiliary winding and start winding may be simultaneously inserted into the core while minimizing damage to the conductors of the different coils.

17. The method of claim 15 wherein the number of conductors in each of the at least three coils of the auxiliary winding is determined in accordance with the area available about at least one face of the core for accommodating end turns thereof whereby easier end turn forming is facilitated in that end turns of the at least three coils are distributed so as to fall within a predetermined area about at least one face of the core.

18. The method of claim 15 wherein the number of conductors in each of the at least three coils of the auxiliary winding is determined in accordance with the optimum distribution of turns necessary in order to reduce the effect of third and fifth harmonics of the start winding.

19. An electric motor operable in a start condition and in a run condition comprising: a magnetic core having a plurality of slots, a main winding on the core, a start winding comprising at least three coils disposed in three slot pairs, respectively, of said core, an auxiliary winding comprising at least three coils disposed in said three slot pairs, respectively, said auxiliary winding being wound in a direction and connected to said start winding such that current flow through the start and auxiliary windings in the start condition of the motor establishes respective magnetic fields which are in a bucking relationship, whereby distribution of the coils of the auxiliary winding within the plurality of slots reduces the end turn factor at at least one face of the core so as to facilitate insertion of the windings into the core and so as to facilitate mounting of the core where the area occupied by the end turns of the windings is desired to be minimized.

20. The motor of claim 19 including switch means for establishing a series connection between the start and auxiliary windings during the run condition of the motor such that the respective magnetic fields established by the start and auxiliary windings are in an aiding relationship.

21. The motor of claim 20 wherein said switch means senses current flow through the main winding and establishes said series connection when the sensed current falls below a predetermined level.

22. The method of fabricating a dynamoelectric machine including a slotted magnetic core having a main winding and a start winding disposed thereon wherein the start winding comprises a plurality of coils with said coils formed with forward turns of conductor and at least two of said coils comprise both forward and reverse turns of a conductor, said method comprising: determining a desired start winding forward turn distribution which yields the desired effective turns, selecting a stator slot coil injection factor in accordance with area available within slots of the magnetic core for inserting the start winding after coils of the main winding have been inserted into a slots whereby said coil injection factor is selected so as to minimize conductor damage during insertion; determining the maximum number of wires that can be inserted into each of the respective slots which is to accommodate said start winding without exceeding the predetermined coil injection factor; determining total required resistance of the start winding desired to facilitate starting of the dynamoelectric machine; developing each said start winding coils by performing multiple formed turns of a conductor and then performing reverse turns of the conductor with the net forward effective turns, which is equal to the number of forward effective turns minus the number of reverse effective turns, equalling the desired number of forward turns previously determined in accordance with that required to achieve the desired number of effective turns in the start winding; developing the remaining coils of the start winding with the number of magnetically offsetting forward and reverse turns in excess of the desired number of forward turns for approximating sinusoidal distribution of the start winding being determined in accordance with the desired resistance of the start winding and in accordance with the predetermined coil injection factor, thereby developing a motor having reduced harmonics in the start winding and having an end turn factor which facilitates both end turn forming and motor mounting within a predetermined available area.

* * * * *